Patented July 26, 1949

2,477,316

UNITED STATES PATENT OFFICE 2,477,316

THERMOPLASTIC HYDROCARBON COMPOSITION

William J. Sparks, Anthony H. Gleason, and Per K. Frolich, Westfield, N. J., assignors, by mesne assignments, to Jasco, Incorporated, a corporation of Louisiana No Drawing. Application March 2, 1946, Serial No. 651,607

4 Claims. (Cl. 260—45.5)

This invention relates to olefinic polymer compositions, relates particularly to compositions of matter composed of iso-olefinic polymers and certain hydrocarbon-soluble interpolymers of styrene or substituted styrenes and diolefin hydrocarbons. These compositions are particularly characterized by possessing excellent electrical properties such as high electrical strength and low dielectric losses, together with good physical properties, including low tendency toward cold flow and good extruding properties at elevated temperatures.

Among the more important polymeric materials are the polyolefins such as polyisobutylene, polybutadiene and polystyrene, all of which have valuable and important physical, mechanical and electrical properties. These polymers have excellent electrical properties, but none have physical properties such as to permit of advantageous use of the valuable electrical properties. Particularly, polystyrene has a very high breakdown voltage and an exceedingly high dielectric value, together with a very low hysteresis loss and very low power factor value. These electrical properties are valuable in any electrical insulation, but polystyrene is a hard, brittle, inelastic resin with low flexibility. No plasticizer has been found, heretofore, which will improve these physical properties without fatally detracting from the desirable electrical properties. Polyisobutylene, likewise, has excellent electrical properties, high dielectric constant, high breakdown value, low hysteresis losses and good power factor value, but it is an elastic material with pronounced cold flow properties but very poor thermoplasticity and poor processing characteristics. A high molecular weight polyisobutylene has been suggested as a plasticizer for polystyrene, since it is one of the few known materials which shows the same desirable electrical properties as polystyrene. However, this combination of substances cannot be made operative because the two materials are incompatible and mutually insoluble. When the two are mixed by hot milling and then allowed to cool, the polystyrene separates out in granular form and acts as an inert insulating filler for the polyisobutylene or in higher concentrations produces disaggregation and mass phase separation with poor flexing properties.

It is, of course, old and well known to prepare synthetic rubbery polymers by copolymerizing styrene and conjugated diolefins in aqueous emulsion in the ratio of about 20 to 60 parts of the former to 80 to 40 parts of the latter. These interpolymers are soft, rubbery materials and are compatible with polyisobutylene as prepared by a low temperature polymerization reaction, but the resulting polymer mixtures do not possess the properties of hardness, toughness and extrudability for use as insulation on electric wires and other extruded or molded articles.

It is the object of this invention to modify the physical properties of polyisoolefins in order to overcome their cold flow properties and to improve their extrudability without injuring their electrical properties and losing low temperature flexibility.

It is also an object of this invention to prepare a composition of matter comprising a linear olefinic polymer such as polyisobutylene and a modified polystyrene, by which composition there are obtained improved physical, chemical and electrical properties as compared to the properties of either single polymeric component, including adequate hardness, toughness, absence of brittleness, stability to light, heat and chemical substances; reduced surface tackiness and high electrical breakdown strength, high electric resistance and low dielectric losses.

A further object of the invention is the incorporation of modified polystyrenes into polyisobutylene to improve the physical properties of the polyisobutylene and modified styrene to obtain easier working, greater stability and improved physical properties.

Particularly, the object of the invention is to prepare an electrical insulating composition for electrical circuit members, in which the insulation is a novel composition having improved electrical and physical properties, and comprises essentially modified styrene copolymers in conjunction with high molecular weight, linear, substantially saturated, plastic, elastic hydrocarbon polymers, such as high molecular weight polymerized isobutylene (having a molecular weight of 80,000 to as high as 300,000).

Other objects and details of the invention will be apparent from the following description.

According to the present invention, modified polystyrene type polymers which retain to a major degree the hardness and thermoplasticity of polystyrene and yet exhibit compatibility with the linear hydrocarbon polymers such as polyisobutylene are blended or compounded, in any proportion, depending upon the hardness, elasticity and modulus desired, with a high molecular weight linear olefinic polymer such as polyisobutylene, polypropylene, or other high molecular weight hydrocarbon polymer formed by polymerizing the olefinic material at temperatures below $-10°$ C. in the presence of a Friedel-Crafts type catalyst to produce the composition of matter of the invention. The range of compositions contemplated include from 95 to 5 percentage parts of resin to from 5 to 95 percentage parts of polyisoolefin. When the resin is the predominant constituent of the composition, the polyisoolefin acts as the modifying agent for the resin while if the polyisoolefin is the predominant constituent, the resin acts as the modifying agent for the polyisoolefin. Polyisobutylenes of molecular weights within the range of 80,000–300,000 are good materials since they have good physical properties, high electrical resistance and low electrical losses and are advantageously used for high frequency insulation. The composition is then formed into appropriate shapes, either by extrusion or by molding.

The modified polystyrene type polymers used in accordance with the present invention are hard, tough, thermoplastic, resinous interpolymers of 65 but particularly 75 to 95 weight per cent of a dichloro-styrene or a trichlorostyrene or of a vinyl aromatic compound corresponding to the formula

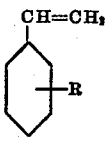

wherein R stands for a member of the group consisting of hydrogen, methyl, ethyl, propyl, methoxy, ethoxy, chlorine, bromine, fluorine or cyano, and 35 to 5 weight per cent of a conjugated diolefin. Vinyl aromatic compounds which may be used in these interpolymers include styrene, para methyl- ethyl- or propyl-styrenes, p-chlorostyrene, dichlorostyrenes, and trichlorostyrenes, bromostyrenes, methoxy styrenes or cyanostyrenes. The diolefins which may be copolymerized with these styrenes are conjugated diolefins containing from 4 to 12, preferably from 4 to 6 carbon atoms per molecule and include butadiene-1,3, isoprene, piperylene, dimethylbutadiene, methyl pentadiene and the like. The preparation of these copolymers is described in detail in our copending application Ser. No. 408,-814, filed August 29, 1941 and abandoned on August 20, 1947, and in a continuation-in-part of said application bearing Serial No. 638,515, filed December 29, 1945.

Essentially these interpolymers are prepared by dispersing the monomers in from an equal to a four fold quantity of water using a suitable emulsifier of the soap type such as sodium oleate, stearate, palmitate or the like or other surface active materials such as salts of alkylated naphthalene sulfonic acids, aliphatic or olefinic sulfonic acids and the like. A polymerization catalyst such as benzoyl peroxide, hydrogen peroxide, alkali metal or ammonium persulfates or perborates and polymerization modifiers such as carbon disulfide, aliphatic mercaptans such as heptyl, octyl, dodecyl, lauryl or octadecyl mercaptan are added to the reaction mixture and the latter is maintained under elevated pressure at temperatures of from about 25 to about 75° C. for about 10 to 75 hours until the desired conversion is reached. If reaction of the monomers is not substantially complete the latex is then stripped of unreacted materials and coagulated, preferably by adding the latex to a solution of a suitable coagulant. The interpolymer is then recovered, washed and dried, preferably on a hot mill (170–180° F.) whereupon it is in condition for use in admixture with polyisoolefins in accordance with this invention. The reaction is ordinarily carried to at least 80–90% monomer conversion in order to obtain hard resinous products of a molecular weight above about 400,000.

While the copolymer as prepared possesses a molecular weight, as determined from its intrinsic viscosity, above about 400,000, it is possible and under some circumstances it is advantageous to break down or partially depolymerize the copolymer in order to enhance its compatibility with the isoolefin or other aliphatic hydrocarbon polymeric material. This depolymerization may be readily effected on milling rollers, in a kneader or other suitable attritioning equipment.

As a specific example of a high molecular weight hydrocarbon polymer utilized in blending with the modified styrene copolymers, the saturated linear hydrocarbon polymer or rubberlike material is obtained by polymerizing an isoolefin such as isobutylene at temperatures below −50° C. or even −100° C. in the presence of an active metal halide of the Friedel-Crafts type, such as boron trifluoride or aluminum chloride dissolved, if desired, in an alkyl halide and preferably in the presence of a suitable diluent or solvent for the isoolefin being polymerized. The polymer produced by this polymerization process has a Staudinger molecular weight which may be regulated by the process of manufacture, for example, ranging from about 2,000 up to 15,000 or 25,000 for a plastic and somewhat sticky polymer, or ranging above about 30,000 and preferably from 80,000 to 300,000 or more for a solid, elastic polymer which is preferred for the purposes of this invention. The higher molecular weight products are obtained by using substantially pure isobutylene and a very low temperature, preferably carrying out the polymerization in the presence of purified ethylene as a solvent. It is preferable to use the high molecular polymers and the starting materials preferably should be substantially free from sulfur compounds and other substances which act as poisons for the linear type polymerization. After the polymerization has been completed, the temperature is allowed to rise to room temperature and the product is washed with water or an aqueous solution of caustic soda or other suitable agent in order to free it of any remaining catalyst. The resulting product is a plastic or elastic solid which is substantially saturated in respect to hydrogen, having an iodine number generally below 1, and is colorless if care be taken to avoid the presence of colored bodies.

The following examples are illustrative of the present invention.

*Example 1*

550 grams of styrene and 318 cc. of a $C_5$ hydrocarbon fraction containing 80% isoprene, which is equivalent to 25% of isoprene in the charge, together with 125 cc. of a 2.8% solution of potassium persulfate in water, and 25 cc. of carbon bisulfide were dispersed in 1250 cc. of a 2½% solution of sodium oleate in water and the mixture was polymerized in a pressure vessel for 20 hours at 55° C. The resulting latex-like dispersion was coagulated by adding saturated brine and isopropyl alcohol. The coagulate, after washing three times with water and once with alcohol in a kneader, was dried by milling on a warm mill. The product was a hard, resinous material of a molecular weight of more than 400,000 calculated from its intrinsic viscosity.

This product was then mixed in the proportion of 1:1 with 100,000 molecular weight polyisobutylene by first milling the material together at 110° F. for 15 minutes and subsequently cold milling the mixture for a similar period. The mixture was then extruded through a size ½ Royle extruder into ⅛" (inside diameter) tubing the die being heated by steam at 40# pressure. A smooth tubing showing very little swelling was obtained at an extrusion rate much higher than previously obtainable in extruding the polyisobutylene alone.

The copolymer of styrene and isoprene prepared as above may be employed in as little as 5% or up to 95% or more of the blend, depending on the physical properties desired in the final blend.

A mixture consisting of 50 parts simple styrene polymer and 50 parts of 100,000 molecular weight polyisobutylene was thoroughly mixed on a roll mill and the resulting apparently homogeneous mixture was treated as described above and extruded in the same way. In this case a rough tube showing a heterogeneous fibrous and brittle structure with poor mechanical properties was obtained. This shows that polystyrene is not compatible with polyisobutylene but that the modified polystyrene used in accordance with the present invention is compatible with polyisobutylene.

*Example 2*

550 grams of styrene and 390 cc. of a C₅ hydrocarbon fraction containing 80% isoprene, which is equivalent to 214 grams or 28% by weight of the isoprene in the charge, together with 125 cc. of a 2.8% solution of potassium persulfate in water and 25 cc. of carbon bisulfide were dispersed in 1300 cc. of a 2½% solution of sodium oleate in water and the mixture polymerized in a pressure vessel for 24 hours at 55–65° C. After coagulating, washing, and drying as in the previous example, the hard, resinous product was likewise mixed in the proportion of 1:1 with 100,000 molecular weight polyisobutylene and exhibited the same characteristics as in the previous example.

*Example 3*

23 grams of 2,3-dimethyl butadiene-1,3 and 67.7 grams of styrene, 18 cc. of a 2.8% of potassium persulfate in water and 2 cc. of carbon bisulfate were dispersed in 180 cc. of a 2.5% solution of sodium oleate in water and the mixture heated for 18 hours at 50–60° C. The resulting modified styrene interpolymer obtained was a hard resin of increased compatibility with saturated high molecular weight linear aliphatic hydrocarbon polymers. The amount obtained was 91.2 grams, which was a 100% yield.

*Example 4*

88½ grams of styrene and 42 grams of a C₅ hydrocarbon fraction containing 70% of piperylene, 20 cc. of 2.8% solution of potassium persulfate in water and 2 cc. of carbon bisulfide were dispersed in 200 cc. of a 2½% solution of sodium oleate in water and the mixture polymerized in a pressure vessel for 18 hours at 70° C. The yield obtained was better than 90% and was a thermoplastic resin, similar to the above examples. After coagulating, washing and drying, the thermoplastic resin was mixed with polyisobutylene in the same proportion as in the previous examples; and similar characteristics in the resulting polyisobutylene-modified polystyrene copolymer was obtained.

*Example 5*

Several copolymers of styrene with butadiene and with isoprene were prepared according to the following recipe:

| | |
|---|---|
| Styrene _____parts__ | 65–95 |
| Diolefin (butadiene or isoprene)___do____ | 35–5 |
| Lauryl mercaptan _____parts at start__ | 0.05 |
| Lauryl mercaptan __parts at 75% conv__ | 0.05 |
| Water _____parts__ | 300 |
| Sodium soap of selectively hydrogenated tallow acids (complete neutralization) _____parts__ | 7 |
| Potassium persulfate _____do____ | 0.45 |
| Temperature _____°C. at start__ | 50 |
| Raised after 50% conversion to ____°C__ | 55 |
| Raised after 75% conversion to __do____ | 60 |
| Conversion _____per cent__ | 95±2 |
| Time _____hours__ | 14–16 |

Four samples using each diolefin were prepared using feed ratios of 65, 75, 85 and 95% of styrene with 35, 25, 15 and 5% respectively of the diolefin in the feeds.

Upon completion of the runs, the reaction mixture was short-stopped with hydroxylamine, hydroquinone or ditertiary butyl cresol, stripped of any unreacted monomers and coagulated by addition thereof to a solution of a suitable coagulant such as sodium chloride brine. The coagulate was recovered by filtration and mill washed and dried. The copolymers obtained were nearly water-white or yellowish transparent resins, all of which were completely soluble in benzene despite the high conversions.

Blends of each of these copolymers with a polyisobutylene of 120,000 Staudinger molecular weight were prepared by softening the resin in an oven at 200° F. and blending with the polyisobutylene on a mill with rolls at 200° F. using a 25/75 ratio of resin to polyisobutylene. The several blends were subjected to extrusion using a Royle extruder with a 0.4" outside diameter and 0.3" inside diameter head. The extrusion temperature was 220° F. The results obtained are summarized in the following table:

| Copolymer | Extrusion Rate | Appearance |
|---|---|---|
| | Grams per minute | |
| Styrene-butadiene: | | |
| 65–35 | 92 | Very smooth. |
| 75–25 | 94.5 | Do. |
| 85–15 | 70 | Smooth. |
| 95–5 | 29.5 | Intermediate. |
| Styrene-isoprene: | | |
| 65–35 | 41 | Rough (But smoother than plain polyisobutylene). |
| 75–25 | 42 | Slightly rough. |
| 85–15 | 48.5 | Intermediate. |
| 95–5 | 35.5 | Smooth. |
| Plain polyisobutylene | 18.5 | Very rough. |

Blends of some of the above resins were made with 100,000 Staudinger molecular weight polyisobutylene as just described and were subjected to extrusion in the same extruder at the same temperature, i. e., at 220° F. The results obtained are summarized below:

*Extrusion processability in 50–50 mill mix of resin and polybutene-100*

| Resin Composition | Styrene-75 Isoprene-25 | Styrene-85 Isoprene-15 | Styrene-75 Butadiene-25 | Styrene-85 Butadiene-15 |
|---|---|---|---|---|
| Extrusion Rate: | | | | |
| Inches per minute | 18½ | 18 | 17 | 14. |
| Grams per minute | 44 | 58 | 30 | 33. |
| Appearance of Tube | Intermediate. | Smooth. | Intermediate. | Intermediate. |

In the above presented examples, the composition of the invention is presented as a heteropolymer or interpolymer of styrene with a conjugated diolefin which interpolymer is then compounded with a simple olefinic polymer such as polyisobutylene to yield a solid solution of the respective components having the desired physical characteristics. It will be noted that to obtain compatibility between the interpolymer and the polyolefin, a certain minimum amount of the diolefin modifier must be incorporated into the interpolymer, the amount varying with the particular diolefin modifying agent employed, that is, if piperylene is used as the modifier, a larger amount must be interpolymerized with the styrene before it becomes compatible with polyisobutylene than is necessary when dimethylbutadiene is used, and when butadiene is the modifying agent in the interpolymer with styrene, a still larger amount must be used before the material becomes compatible with polyisobutylene. Furthermore, the physical characteristics such as stiffness, presence or absence of tendency towards cold flow, brittleness and the like of the styrene interpolymer is very greatly modified by the proportion and nature of the diolefin used when preparing the resin.

Also, the various procedures above disclosed are not limited to polymers and interpolymers of styrene. Similar interpolymers of indene or coumarone or vinyl naphthalene with diolefin modifier such as butadiene, piperylene, isoprene and the like, may be made which are compatible with polyisobutylene, polybutadiene, the interpolymers of isobutylene and butadiene and the like.

The modified styrene polymers prepared in accordance with the above examples are not only applicable to the blending with polyisobutylene but are also applicable for blending with oils and with the predominantly hydrocarbon rubber-like flexible or plastic polymeric bodies, such as natural rubber, butadiene-styrene emulsion interpolymer, polyethylene, polypropylene, etc. Substances having a further plasticizing action on either of the component polymers may likewise be added if desired and the usual organic and inorganic fillers or mixtures thereof may be incorporated therein.

The present invention, therefore, provides a method for increasing the modulus, decreasing the cold flow and enhancing the extruding properties of polyisobutylene and other plastic or elastic bodies by incorporating therein 5 parts to 95 parts of modified type styrene copolymer. The mixtures of polyisobutylene and modified styrene copolymers are useful for preparing structural articles of all kinds, such as extruded tubing capable of being drawn and turned into shaped articles, wire insulation, solid rods, (which when drawn hot and set under tension, give as high as 14,000# tensile strength/sq. in.), pressed or molded articles and for the preparation of polymer coated fabrics of improved light resistance and reduced tackiness.

The modified styrene copolymer-high molecular weight isoolefin polymer compositions of the present invention are particularly valuable in the construction of ultra high frequency radio transmitting and receiving systems, and for insulating purposes because of the very low dielectric losses occurring in them. This very low loss occurs because of the fact that the percentage energy loss of radio frequency energy with a given dielectric material increases as the frequency increases and at frequencies ranging from 1 megacycle up, especially at frequencies above 10 megacycles, the loss of energy from the dielectric hysteresis is prohibitively high.

The very low hysteresis loss of the compositions of the present invention permit their use as insulating materials at these very high frequencies with a minimum of energy loss, and maximum transfer of energy through the insulated circuits and a minimum of heat deterioration in the insulation itself even where associated with circuits carrying relatively large amounts of ultra high frequency energy at high voltages.

The compositions comprising the styrene-diolefin copolymers and high molecular weight polyisobutylene are also of value in electrical insulators requiring high resistance to ozone. It has been known that the polyisobutylenes are suitable for this purpose but their widespread adoption has not occurred because of the processing difficulties which now can be overcome by use of these compositions without sacrifice of the outstanding ozone resistance of the polyisobutylenes alone. These compositions are also valuable as linings in pipes and tanks or for covering other process equipment which is used to contain or otherwise handle water saturated with chlorine. The best compositions for this purpose are those containing 70–80% of polybutene (about 80,000 or higher Staudinger molecular weight) and 30–20% of styrene-diolefin copolymers.

The interpolymers are useful in combination with practically any of the natural and synthetic resins and gums with some of which they form true solutions and others they form a disperse phase within a continuous phase. They are particularly useful with such materials as the polyindene-coumarone resins, the polyvinyl chlorides, polyvinyl acetylene, polycoumarones, polyvinyl acetate, polyacrylates and methacrylates, cellulose esters and ethers, chlorinated rubber, phenol aldehyde resins, the natural and synthetic waxes, rosin and natural resins, polyamides, factice, alkyd resins, phenol formaldehyde condensation resins such as Bakelite, resins obtained from petroleum residues, hydro rubber, mineral waxes, petroleum waxes and vegetable waxes.

The interpolymers alone or in combination with polyisobutylene, polyethylene, gutta percha, balata, natural or synthetic rubber can be readily compounded with a wide range of filler materials to give new and technically useful compositions. The following list shows representative suitable compounding substances:

Chlorinated paraffin wax
Chlorinated olefin polymers
Alkyd resins
Oxidized polymeric materials
Chlorinated resins
Carbon black, active reinforcing or inactive
Ethyl abietate
Polyesters
Polycyclopentadiene resins
Polymerized terpenes
Polymerized ethylene
Polyvinyl acetal resin
Clays
Tricresyl phosphate
Asbestos
Dibutyl phthalate
Wood flour
Cetyl methacrylate polymer
Asphalt
Pitch
Polyhydronaphthalenes
Drying oil resins
Mineral rubbers
Hydrogenated terpene polymers Thus, the invention provides a new and useful composition of matter composed of an interpolymer of a polymerizable material such as styrene which tends to yield a hard, brittle, resinous polymer, with a modifier such as butadiene, isoprene and the like, as above described, which is then compounded with a simple olefinic polymer or olefinic interpolymer to yield tough, non-brittle, flexible, but relatively inelastic compositions which are capable of thermoplastic molding and which possess good electrical and physical properties, and low solubility in most of the organic solvents. The compositions are also of value in the construction of gaskets, protective films, mixtures with asphalts, etc. The compositions may likewise be emulsified to form coating compositions for insulating wires, gaskets and for coating fabrics to impart waterproofing properties, etc.

While there are above disclosed but a limited number of embodiments of the invention, it is possible to produce still other embodiments without departing from the inventive concept herein disclosed, and it is therefore desired that only such limitations be imposed upon the appended claims as are stated therein or required by the prior art. This application is a continuation-in-part of our Application Serial No. 408,716, filed August 29, 1941, and abandoned on May 23, 1946.

What we claim and desire to secure by Letters Patent is:

1. A composition of matter which comprises a mixture of 5 to 95 percentage parts of polyisobutylene of 30,000 to 300,000 molecular weight as determined by the Staudinger method, and 95 to 5 percentage parts of a hard, resinous, thermoplastic emulsion copolymer of 75 to 95 weight per cent of styrene and from 25 to 5 weight per cent of a conjugated diolefin of from 4 to 6 carbon atoms per molecule, being a hard, homogeneous, thermoplastic mixture which is readily extrudable and possessed of valuable physical and electrical properties.

2. A composition of matter which comprises a mixture of 70 to 80 percentage parts of polyisobutylene of 30,000 to 300,000 molecular weight as determined by the Staudinger method, and 30 to 20 percentage parts of a hard, resinous thermoplastic emulsion copolymer of 75 to 95 weight per cent of styrene and from 25 to 5 weight percent of butadiene, being a hard, homogeneous, thermoplastic mixture which is readily extrudable and possessed of valuable physical and electrical properties.

3. A composition of matter which comprises a mixture of 70 to 80 percentage parts of polyisobutylene of 30,000 to 300,000 molecular weight as determined by the Staudinger method, and 30 to 20 percentage parts of a hard, resinous, thermoplastic emulsion copolymer of 75 to 95 weight per cent of styrene and from 25 to 5 weight per cent of isoprene, being a hard, homogeneous, thermoplastic mixture which is readily extrudable and possessed of valuable physical and electrical properties.

4. A composition of matter which comprises a mixture of 5 to 95 percentage parts of polyisobutylene of 30,000 to 300,000 molecular weight as determined by the Staudinger method, and 95 to 5 percentage parts of a hard, resinous, thermoplastic emulsion copolymer of 75 to 95 weight per cent of styrene and from 25 to 5 weight per cent of dimethyl butadiene, being a hard, homogeneous, thermoplastic mixture which is readily extrudable and possessed of valuable physical and electrical properties.

WILLIAM J. SPARKS.
ANTHONY H. GLEASON.
PER K. FROLICH.

REFERENCES CITED

The following references are of record in the file of this patent:

UNITED STATES PATENTS

| Number | Name | Date |
| --- | --- | --- |
| 1,991,367 | Beck | Feb. 19, 1935 |
| 2,138,895 | Wiezevich | Dec. 6, 1938 |
| 2,282,002 | Scott | May 5, 1942 |
| 2,335,124 | Konrad et al. | Nov. 23, 1943 |
| 2,381,267 | Drake | Aug. 7, 1945 |
| 2,414,803 | D'Alelio | Jan. 28, 1947 |

FOREIGN PATENTS

| Number | Country | Date |
| --- | --- | --- |
| 345,939 | Great Britain | Mar. 16, 1931 |
| 601,253 | Germany | Aug. 11, 1934 |
| 456,442 | Great Britain | 1936 |